United States Patent
Wahl et al.

(10) Patent No.: US 9,683,301 B2
(45) Date of Patent: Jun. 20, 2017

(54) GOLF CLUB HEAD WITH FACE INSERT

(71) Applicant: Taylor Made Golf Company, Inc., Carlsbad, CA (US)

(72) Inventors: Bret H. Wahl, Escondido, CA (US); Xinhui Deng, Carlsbad, CA (US)

(73) Assignee: TAYLOR MADE GOLF COMPANY, INC., Carlsbad, CA (US)

( * ) Notice: Subject to any disclaimer, the term of this patent is extended or adjusted under 35 U.S.C. 154(b) by 85 days.

(21) Appl. No.: 14/710,343

(22) Filed: May 12, 2015

(65) Prior Publication Data

US 2015/0240373 A1    Aug. 27, 2015

Related U.S. Application Data

(62) Division of application No. 13/472,811, filed on May 16, 2012, now Pat. No. 9,033,819.

(51) Int. Cl.
| | |
|---|---|
| *C25D 1/00* | (2006.01) |
| *A63B 60/52* | (2015.01) |
| *C25D 1/10* | (2006.01) |
| *B23P 11/00* | (2006.01) |
| *A63B 53/04* | (2015.01) |
| *C25D 1/20* | (2006.01) |

(52) U.S. Cl.
CPC ............ *C25D 1/003* (2013.01); *A63B 53/047* (2013.01); *A63B 60/52* (2015.10); *B23P 11/00* (2013.01); *C25D 1/00* (2013.01); *C25D 1/10* (2013.01); *C25D 1/20* (2013.01); *A63B 2053/042* (2013.01); *A63B 2053/0416* (2013.01); *A63B 2053/0425* (2013.01); *A63B 2053/0445* (2013.01); *Y10T 29/49885* (2015.01)

(58) Field of Classification Search
CPC . C25D 1/003; C25D 1/10; C25D 1/20; C25D 1/00; A63B 60/52; A63B 53/047; A63B 2053/0416; A63B 2053/0445; A63B 2053/0425; A63B 2053/042; B23P 11/00; Y10T 29/49882
See application file for complete search history.

(56) References Cited

U.S. PATENT DOCUMENTS

| | | | |
|---|---|---|---|
| 4,566,939 | A | 1/1986 | Miller et al. |
| 5,924,939 | A | 7/1999 | Grace et al. |
| 5,967,903 | A | 10/1999 | Cheng |
| 6,074,309 | A | 6/2000 | Mahaffey |
| 6,193,615 | B1 | 2/2001 | Hirota |
| 6,368,231 | B1 | 4/2002 | Chen |
| 6,705,385 | B2 | 3/2004 | Ray et al. |
| 6,743,117 | B2 | 6/2004 | Gilbert |
| 6,981,923 | B2 | 1/2006 | Chappell |
| 7,429,219 | B2 | 9/2008 | Huang |

(Continued)

FOREIGN PATENT DOCUMENTS

| | | |
|---|---|---|
| JP | 2002102398 | 4/2002 |
| JP | 2007319344 | 12/2007 |

(Continued)

*Primary Examiner* — Louis Rufo
(74) *Attorney, Agent, or Firm* — Klarquist Sparkman, LLP

(57) ABSTRACT

A golf club head is provided having a club body and a contact plate secured to the club body. The contact plate defines at least a portion of a striking surface having a plurality of striking surface grooves. The contact plate is formed using an electroforming process.

11 Claims, 13 Drawing Sheets

(56) References Cited

U.S. PATENT DOCUMENTS

| | | |
|---|---|---|
| 7,594,862 B2 | 9/2009 | Gilbert |
| 7,794,333 B2 | 9/2010 | Wallans et al. |
| 7,922,604 B2 | 4/2011 | Roach et al. |
| 8,025,979 B2 | 9/2011 | Palumbo et al. |
| 8,449,406 B1 | 5/2013 | Frame et al. |
| 2008/0300068 A1 | 12/2008 | Chao |
| 2010/0101961 A1* | 4/2010 | Lee .................. B23P 15/24 205/69 |
| 2011/0003171 A1 | 1/2011 | Palumbo et al. |
| 2011/0028240 A1 | 2/2011 | Wahl et al. |
| 2011/0281665 A1 | 11/2011 | Kawaguchi et al. |
| 2012/0135819 A1* | 5/2012 | Uetz .................. A63B 53/0466 473/331 |
| 2012/0289361 A1 | 11/2012 | Beach et al. |
| 2013/0165257 A1 | 6/2013 | Dipert et al. |

FOREIGN PATENT DOCUMENTS

| | | |
|---|---|---|
| JP | 2008000509 | 1/2008 |
| JP | 2008023348 | 2/2008 |
| JP | 2011115607 | 6/2011 |

\* cited by examiner

GOLF CLUB HEAD WITH FACE INSERT

CROSS REFERENCE TO RELATED APPLICATION

This application is a divisional of U.S. patent application Ser. No. 13/472,811, filed May 16, 2012, which is incorporated herein by reference.

FIELD

The disclosure pertains to golf clubs and methods of manufacturing golf clubs. More particularly, the disclosure pertains to face inserts for golf club heads, and methods of manufacturing face inserts for golf club heads.

BACKGROUND

Technologies have been developed for manufacturing face inserts for golf club heads. Conventional ways of making golf club heads that include face inserts include providing a club head body having a void or recess into which a face insert is placed, then attaching the face insert to the club head body via adhesive bonding, welding, or another attachment method. The face insert is typically formed by casting, forging, stamping, rolling, etc.

Traditionally, the striking zone of any iron or wedge face includes scoreline grooves, and some type of texturing on the face in between the scorelines to roughen the surface. The purpose of scoreline groove and texture on the striking zone is for the enhancement of ball spin, launch conditions, or performance by increasing the coefficient of friction between the ball cover and face. Conventional ways of making scoreline grooves include casting, forging, CNC milling, engraving, saw cutting, pressing, stamping, etc. Any texture on the face or in between grooves is usually created with a separate operation from the scoreline grooves to increase its surface roughness. Roughening the face surface is conventionally done by blasting (with various media, such as aluminum oxide, glass bead, zirconium bead, steel shot, or the like) or through a milling or fly-cutting machining operation. Microtexturing the face (process of making very fine texture patterns) can be achieved by milling or cutting, scratching, laser etching or chemical etching, or EDM.

Because of the two separate operations, the alignment between scorelines and microtexture features without interference with each other can be a challenge. Also, in order to optimize the performance of a golf club within the 2010 USGA rules, manufacturers seek operations with very tight manufacturing tolerance of scoreline dimensions and surface roughness to be as close as possible to the USGA limit. The tolerance of today's scoreline and roughness dimensions and repeatability of conventional methods often do not facilitate the highest performance requirement. Cutters or spinning tools used in scoreline engraving or fly cutting have limited life (3-7 heads only). Tool wear (even minor wear) can cause scoreline dimensions to be out of spec. Very often, scoreline grooves or microtexture formed do not conform to design specs or the USGA's rules. Creating face texture with milling operations can also lead to circular patterns which aren't consistent across the face, leading to variability in surface roughness at different locations.

The durability of scoreline grooves and microtexture is another challenge. Wearing out of microtexture or damage of scoreline grooves edges after sand bunker shots or thick turf shots is common. These can degrade performance. Although post face hardening processes or coatings, such as QPQ, or nitriding, or surface quenching, or plating, or PVD, can protect or improve durability, it is a challenge to maintain original dimensions and uniform hardness.

SUMMARY OF THE DESCRIPTION

Golf club heads comprise a club head body and a striking plate secured to the club head body. The striking plate comprises a contact plate defining at least a portion of a striking surface having a plurality of striking surface grooves. The striking plate is formed using an electroforming process.

According to a first aspect, a golf club head includes a club head body having a forward surface and a rear surface. A striking plate is secured to the forward surface of the club head body, the striking plate defining at least a portion of a striking surface having a plurality of striking surface grooves. The striking plate is formed of a metallic material that is suitable for use in an electroforming process. In some embodiments, the striking plate comprises an alloy of nickel and cobalt having a nickel concentration of at least about 55%, such as at least about 65%, such as at least about 75%, and a cobalt concentration of at least about 10%, such as at least about 20%, such as at least about 25%.

In one example of the first aspect, the striking plate comprises an alloy of nickel and cobalt having a nickel concentration that is between about 55% to about 90%, such as between about 65% to about 80%, such as from about 65% to about 75%, and a cobalt concentration that is between about 10% to about 45%, such as between about 20% to about 35%, such as between about 25% to about 35%.

In another example of the first aspect, the club head body includes a recessed region on the forward surface of the club head body, and the striking plate is secured to the club head body such that the striking plate resides within the recessed region.

According to a second aspect, a golf club head includes a club head body having a forward surface and a rear surface. One or more backing plates are provided, with the backing plate(s) having a forward surface and a rear surface. The rear surface of a backing plate is secured to the forward surface of the club head body. A striking plate is secured to the forward surface of the backing plate, the striking plate defining at least a portion of a striking surface having a plurality of striking surface grooves. The striking plate is formed of a metallic material that is suitable for use in an electroforming process. In some embodiments, the striking plate comprises an alloy of nickel and cobalt having a nickel concentration of at least about 55%, such as at least about 65%, such as at least about 75%, and a cobalt concentration of at least about 10%, such as at least about 20%, such as at least about 25%.

In one example of the second aspect, the striking plate comprises an alloy of nickel and cobalt having a nickel concentration that is between about 55% to about 90%, such as between about 65% to about 80%, such as from about 65% to about 75%, and a cobalt concentration that is between about 10% to about 45%, such as between about 20% to about 35%, such as between about 25% to about 35%.

In another example of the second aspect, the club head body includes a recessed region on the forward surface of the club head body, and the striking plate is secured to the club head body such that the striking plate resides within the recessed region.

In still other examples of the second aspect, the backing plate can be substantially flat on both its forward and rear surfaces, it can have a plurality of projections and recesses on its forward surface, it can have a plurality of through-holes having a variety of shapes and/or sizes, or it can have a combination of these features. The backing plate can be a metal, a metal alloy, a metallic material, an elastomer, a polymer, a rubber, a ceramic, a silicone, a fiber-glass, a multi-material combination, or mixtures or combinations of the foregoing materials.

In a third aspect of the present invention, a method of manufacturing a golf club head includes the steps of: providing a mandrel having a negative physical representation of a golf club striking plate; electroforming a striking plate using the mandrel; and attaching the electroformed striking plate to a body of the golf club head.

In an example of the third aspect, the step of providing a mandrel includes: providing a master of a golf club head striking plate; and manufacturing the mandrel from the master.

In another example of the third aspect, the step of manufacturing the mandrel includes electroforming the mandrel.

In still another example of the third aspect, the step of electroforming a striking plate includes: placing the mandrel into an electrolytic bath; electroforming a striking plate sheet using the mandrel, with the striking plate sheet comprising a plurality of striking plates; removing the striking plate sheet and mandrel from the electrolytic bath; and separating each of the plurality of striking plates from the striking plate sheet.

These and other features and aspects of the disclosed technology are set forth below with reference to the accompanying drawings.

DETAILED DESCRIPTION

Figure 1A:
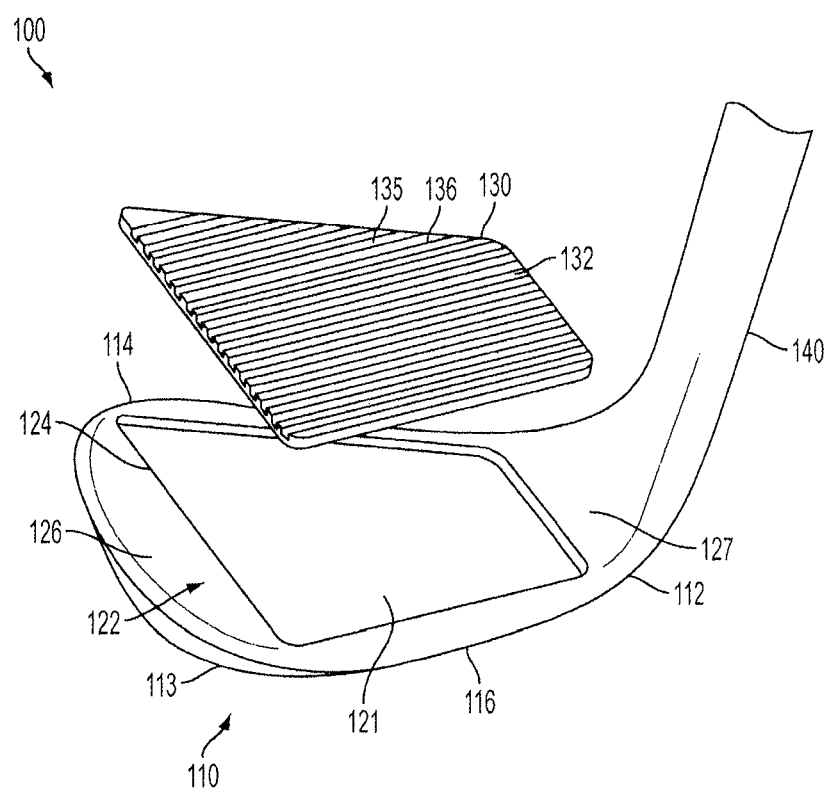
FIG. 1A is an exploded view of a representative embodiment of an iron-type golf club head.
Figure 1B:
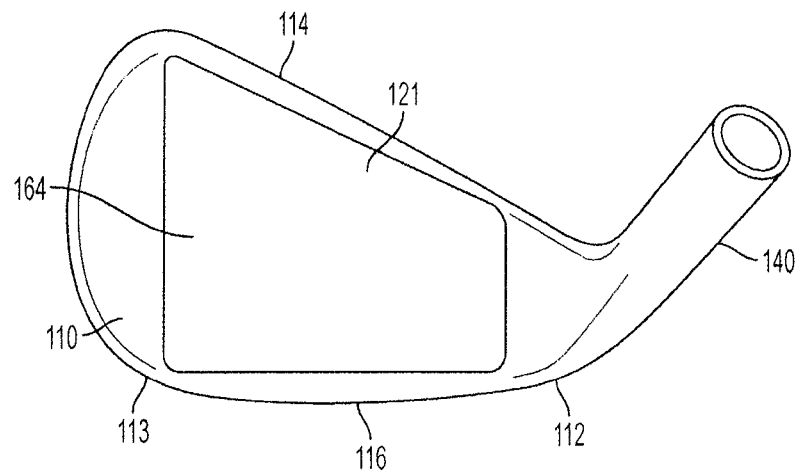
FIG. 1B is an elevational view of a head body of the iron-type golf club head of FIG. 1A.

Various embodiments and aspects of golf clubs and golf club heads of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Embodiments of an iron-type golf club head providing desired precision, durability, and manufacturability are described herein. In some embodiments, the iron-type golf club head has a striking plate or contact plate that is manufactured using an electroforming process, then attached to a club head body in a separate assembly step. The electroforming process provides the ability to manufacture striking plates (and other golf club components) with a high degree of precision, and to achieve manufacturing yield rates that are much higher than the rates achieved by previous striking plate manufacturing processes. In addition, in some embodiments, iron-type golf club head striking plates manufactured using an electroforming process achieve greater hardness and durability than comparable striking plates manufactured using previous processes.

Referring to FIGS. 1A-1F, a representative iron-type club head 100 includes a head body 110 and a striking plate or contact plate 130. The head body 110 includes a heel 112, a toe 113, a top line 114, a sole 116, and a hosel 140 configured to attach the club head 100 to a shaft (not shown in FIGS. 1A-1F). The head body 110 defines a striking plate mounting region 121 configured to receive the striking plate 130. Club head mass may be distributed about the perimeter of the club body 110 based on a particular mass distribution for the club head 100 selected by a club head designer. Perimeter weighting can take various forms. One design includes a sole bar or other mass at or near the club head sole 116 to provide a center of gravity that is situated low in the club head 100 and behind the striking plate 130 as viewed from a striking surface 132 of the club head. Other designs include mass distributed to the heel 112 and/or toe 113 regions of the perimeter of the club head body 110 to achieve desired performance.

For convenience herein, positions and spacings of club components and features are described with respect to a club as situated in a normal address position with the sole 116 resting upon a flat ground plane. Directions from a club face toward a golf ball are referred to as forward, and directions away from the golf ball are referred to as rearward. Directions noted as up and down are vertically up and down with the club situated in the normal address position. As used herein, "normal address position" means the club head position wherein a vector normal to the center of the club face substantially lies in a first vertical plane (i.e., a vertical plane is perpendicular to the ground plane), a centerline axis of the hosel 140 substantially lies in a second vertical plane, and the first vertical plane and the second vertical plane substantially perpendicularly intersect. The center of the club face is determined using the procedures described in the USGA "Procedure for Measuring the Flexibility of a Golf Clubhead," Revision 2.0, Mar. 25, 2005.

As shown in FIG. 1A, the striking plate 130 and the head body 110 are preferably formed separately. In such a design, the completed club head is made by securing the striking plate 130 to the mounting area 121 by bonding with an adhesive, welding, or other process. The mounting area 121 defines a recess, or pocket, formed in the forward surface of the club head body 110. In the embodiment shown, the perimeter of the recess defined by the mounting area 121 is slightly larger than the perimeter of the striking plate 130, thereby providing for the ability to position the striking plate 130 into the recess. A gap or seam 124 is thereby defined between the walls of the recess of the mounting area 121 and the perimeter of the striking plate 130. In some embodiments, the seam 124 has a width that is preferably less than about 0.5 mm, such as less than about 0.25 mm, such as less than about 0.1 mm. In alternative embodiments, the club head body 110 does not include a recessed mounting area 121. Instead, the striking plate 130 is secured directly to the forward-facing surface of the club head body 110, and no gap or seam 124 is formed.

A front surface 122 of the club is defined by both a striking surface 132 of the striking plate 130 and portions 126, 127 of the club body 110. The front surface 122 can be polished, blasted using an abrasive media, or ground to remove any front surface edges situated at the striking plate/club body seam 124. In some examples, the portions 126, 127 are polished and the front surface 132 of the striking plate 130 is finely ground. In other examples, either or both of the portions 126, 127 and the front surface 132 of the striking plate 130 and other portions of the club head may include a coating, such as a physical vapor deposition (PVD) coating using the processes described in U.S. patent application Ser. No. 11/749,723, filed on May 16, 2007, which is hereby incorporated by reference in its entirety. The striking surface 132 is a substantially planar grooved surface configured to strike a golf ball, although for some players, other portions of the front surface 122 also contact the golf ball.

As noted above, grinding, blasting, and/or polishing operations can be used to remove any excess material or irregularities introduced in the bonding, welding, or other process, or to provide a selected club head appearance such as, for example, a specularly reflective polished appearance, a fine ground appearance, or other appearance. Another alternative surface treatment includes applying a PVD coating to the striking plate 130 prior to attachment to the club head body 110. For example, in some embodiments, a single layer of a titanium carbide containing material is applied having a thickness of less than 1 micrometer, such as about 0.4 to 0.6 micrometer. The striking plate 130 preferably includes a set of grooves, such as exemplary grooves 135, 136 formed in the striking surface 132. The striking plate 130 may also include an additional surface texture, such as secondary surface markings 137 (see, e.g., FIGS. 1D and 1F).

The thickness of the striking plate 130 can be selected to reduce mass associated with the striking plate 130, so that additional mass can be distributed to other parts of the club head to achieve intended club design goals. The striking plate thickness is selected consistent with long term club use to avoid premature striking plate failure due to fatigue cracking and other such failure modes, and redistributed mass is situated low on the club head and rearward of the striking plate 130 or wherever needed to dictate a desired performance. In use, the striking plate 130 is subject to numerous high speed impacts with a golf ball, and should resist permanent deformation. Different types of irons (e.g., long irons and short irons) can experience different forces in golf ball impacts, and the striking plate thickness can be adjusted accordingly, if desired.

As described above, the striking plate 130 and the head body 110 are preferably formed separately. In some embodiments, the head body 110 is formed by casting, forging, stamping, or other known manufacturing process. Some examples of materials that can be used to form the head body 110 include, without limitation, carbon steels (e.g., 1020 or 8620 carbon steel), stainless steels (e.g., 304, 410, or 431 stainless steel), PH (precipitation-hardenable) alloys (e.g., 17-4, C450, or C455 alloys), titanium alloys (e.g., 3-2.5, 6-4, SP700, 15-3-3-3, 10-2-3, or other alpha/near alpha, alpha-beta, and beta/near beta titanium alloys), aluminum/aluminum alloys (e.g., 3000 series alloys, 5000 series alloys, 6000 series alloys, such as 6061-T6, and 7000 series alloys, such as 7075), magnesium alloys, copper alloys, nickel alloys, glass fiber reinforced polymers (GFRP), carbon fiber reinforced polymers (CFRP), metal matrix composites (MMC), ceramic matrix composites (CMC), and natural composites (e.g., wood composites). High strength materials having a relatively high modulus of elasticity (greater than about 50 GPa, 100 GPa, 150 GPa, 200 GPa, or 250 GPa) are generally preferred.

In the embodiment shown, the striking plate 130 is formed using an electroforming process. Electroforming is a metal forming process that forms objects by plating a metal layer onto a base form, known as a mandrel, which is removed after plating. Technically, it is a process of synthesizing a metal object by controlling the electrodeposition of metal passing through an electrolytic solution onto a metal or metalized form. The electroforming process differs from electroplating in that the object formed on the mandrel is much thicker and can exist as a self-supporting structure when the mandrel is removed. Electroforming provides the ability to replicate a mandrel surface precisely atom-by-atom with practically no loss of fidelity.

In the electroforming process, an electrolytic bath is used to deposit nickel, cobalt, nickel-cobalt alloy, or other electroplatable metal/metal alloy onto a conductive patterned surface, such as coated glass, stainless steel, or other conductive metallic surface. Once the plated material has been built up to the desired thickness, the electroformed part is stripped off the master substrate. This process allows high-quality duplication of the master and therefore permits quality production at low unit costs with high repeatability and excellent process control.

Electroforming achieves higher precision in comparison to other basic metal forming processes (e.g., casting, forging, stamping, and machining). For example, an electroformed member may be formed to dimensional tolerances, complexity, and/or light weight that are not possible with the foregoing metal forming processes. Electroformed metal and metal alloys also demonstrate superior properties over wrought metal due to their refined crystal structure. Multiple layers of electroformed metal can be molecularly bonded together, or to different substrate materials to produce complex structures with "grown-on" projections. Tolerances of 1.5 to 3 nanometers are possible.

Figure 6:
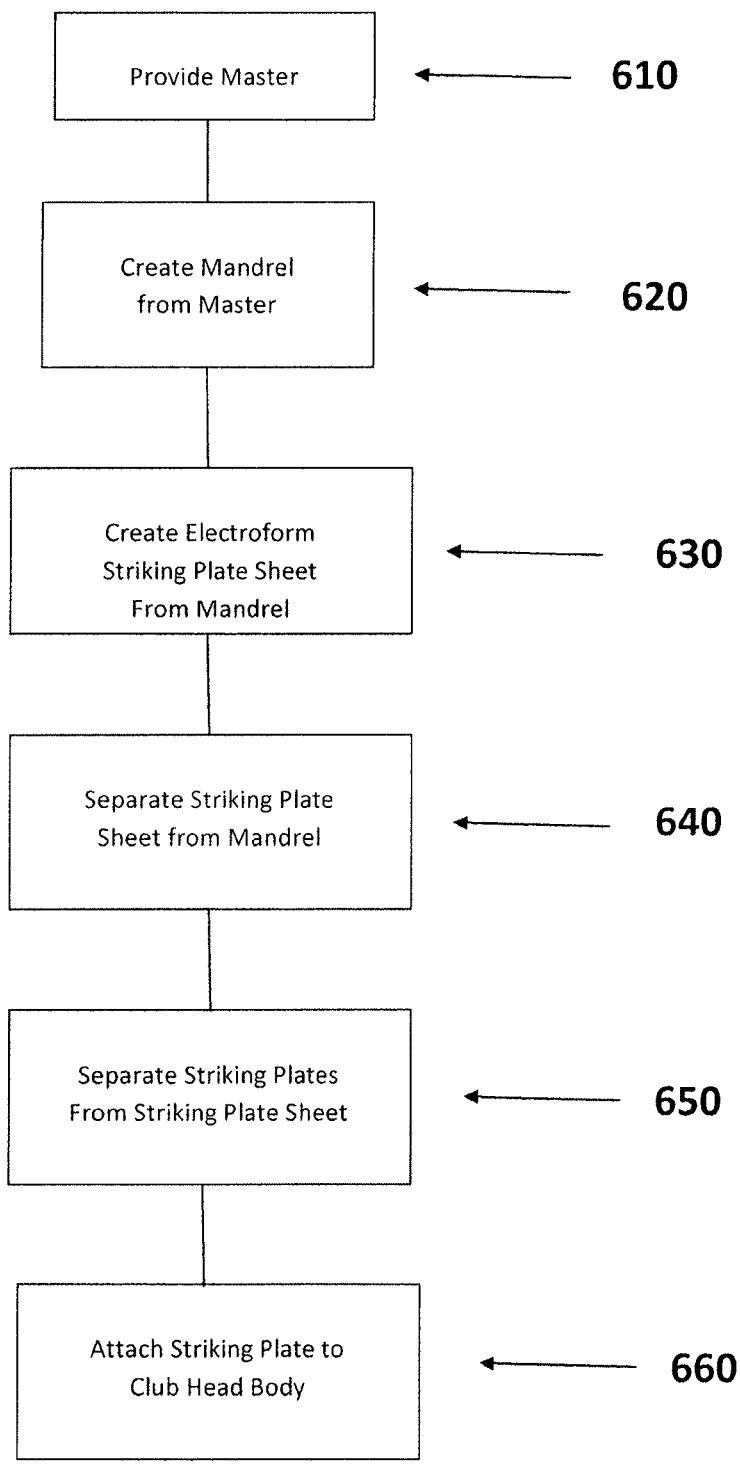
FIG. 6 is a flowchart showing steps included in an embodiment of a method for manufacturing a golf club head.

As shown in FIG. 6, in a preferred method of electroforming a striking plate, a master is provided 610 using any known method, such as by forming scorelines or grooves and other surface texture markings onto a metal sheet (e.g., 304 stainless steel) by milling, etching, or other suitable methods. The surface markings on the master are constructed to a very tight tolerance, because they will be replicated very precisely during the electroforming process. In a preferred method, the master comprises a sheet having a length and width sufficient to accommodate several striking plates (e.g., about 4 to about 16 or more) being formed and subsequently cut into discrete striking plates from an electroformed sheet.

Once the master is manufactured, it may be used to construct one or more mandrels 620. Each mandrel is constructed of a metal or metal alloy using an electroforming process. For example, the master may be placed into an electrolytic bath, and a metallic or metal alloy mandrel is grown on the surface of the master. In a preferred method, the mandrel is formed of a nickel-cobalt alloy discussed in more detail below, though other suitable electroforming materials may be used. Once the electroformed layer has grown to a thickness suitable for its use as a mandrel (e.g., from about 0.02 mm to about 6.35 mm thick, such as from about 0.20 mm to about 0.50 mm thick, such as about 0.25 mm thick), the master/mandrel is removed from the electrolytic bath, and the mandrel is removed from the master. The front (mating) surface of the mandrel is a precise negative of the front (mating) surface of the master, thereby allowing the mandrel to be used to create a striking plate sheet that has surface markings that are an exact replica of the master. The mandrel is then prepared for use in forming the striking plates. Additional mandrels may be manufactured using the master and the procedure described.

In the preferred method, one or more mandrels are then placed into an electrolytic bath, and a metallic or metal alloy striking plate sheet is grown on the surface of the mandrel 630. As noted above, the striking plate sheet includes the identical surface markings that are contained on the master from which the mandrel was created, to a very high degree of precision. The striking plate sheet is formed to a desired thickness—i.e., the desired thickness of the striking plate discussed below—after which the electroformed striking plate sheet and mandrel are removed from the electrolytic bath. The striking plate sheet is then removed or separated from the mandrel 640. The striking plate sheet is then prepared for cutting out individual striking plates, and the mandrel is prepared for re-use in electroforming additional striking plate sheets.

As noted above, in the preferred method, an electroformed striking plate sheet has a size and dimensions sufficient to accommodate a plurality of individual striking plates. For example, a single electroformed striking plate sheet may accommodate from about 4 to about 16 or more striking plates. After the electroformed striking plate sheet is removed from the mandrel, the individual striking plates are cut from the sheet 650. In the preferred method, the striking plates are cut from the striking plate sheet via laser cutting, though other methods (e.g., die cutting, wire EDM, water jet, CNC milling, or the like) are used in alternative embodiments. The striking plates are then prepared for attachment to the club head body, such as by using a blasting media to enhance adhesion followed by a general cleaning, and are then attached via adhesive bonding, welding, or other suitable method 660.

Figure 1C:
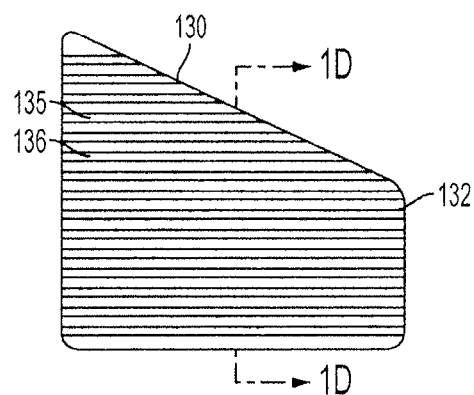
FIG. 1C is an elevational view of a striking plate of the iron-type golf club head of FIG. 1A.
Figure 1D:
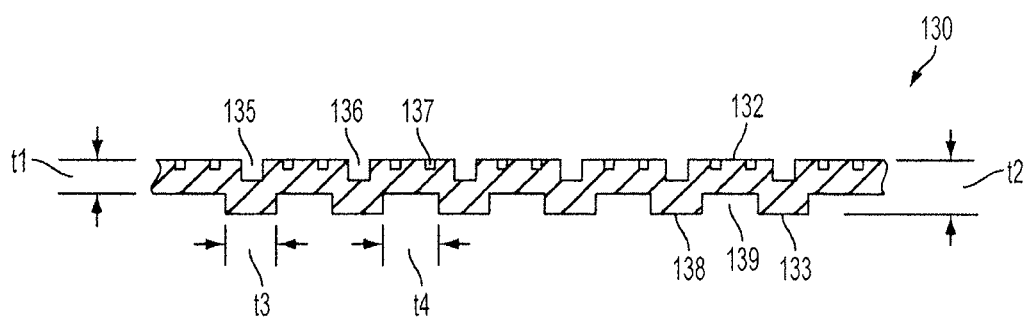
FIG. 1D is a sectional view of a portion of the striking plate of FIG. 1C.
Figure 1E:
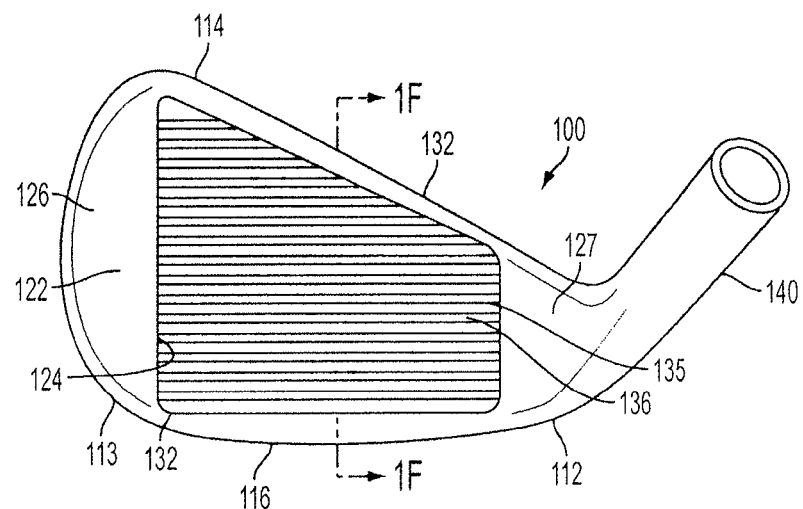
FIG. 1E is an elevational view of the iron-type golf club head of FIG. 1A.

FIGS. 1C and 1D show an embodiment of a striking plate 130 produced using the electroforming processes described above. As shown, the striking plate 130 includes a plurality of scorelines or grooves 135, 136 and an additional plurality of surface texture markings 137 formed on the forward striking surface 132. Additionally, as a result of the electroforming process, the striking plate rear surface 133 includes a plurality of projections 138 defining a plurality of recesses 139 therebetween. Advantageously, all of the foregoing surface features located on the striking surface 132 and rear surface 133 of the striking plate 130 are formed simultaneously during the electroforming process. In conventional striking plate machining processes, the scorelines or grooves and any additional surface texture markings are cut or etched into the surfaces of the striking plate in separate processes after the striking plate is formed. By contrast, the electroforming processes described herein provide the ability to form the scorelines or grooves 135, 136, surface texture markings 137, projections 138, recesses 139, and other striking plate surface features as a part of the same metal/metal alloy growing process by which the striking plate 130 is created during the electroforming process.

As noted above, the electroforming process includes creating a striking plate sheet grown on a mandrel in an electrolytic bath. There are a number of metals or metal alloys that are suitable for use in forming the electroformed striking plate sheet. Examples of suitable metals include nickel, cobalt, manganese, iron, and tungsten. Nickel alloys, for example, have higher strength by the addition of cobalt and/or manganese. In one embodiment, a suitable material is a cobalt-tungsten alloy. In some embodiments, the hardness of the striking plate ranges from about 300 HV (Vickers Hardness) to about 700 HV, or from about 30 HRC (Rockwell Scale) to about 60 HRC. In some embodiments, the striking plate sheet is formed of an alloy of nickel and cobalt having a nickel concentration of from about 90% to about 55%, and a cobalt concentration of from about 10% to about 45%. In some preferred embodiments, the nickel concentration is from about 80% to about 65%, such as from about 75% to about 65%, and the cobalt concentration is from about 20% to about 35%, such as from about 25% to about 35%. Some impurities may be present, but these are typically on the order of less than 1%. The striking plates 130 formed using these materials at these concentrations have a desirable hardness of about 500 HV (Vickers Hardness) or more.

In the embodiment shown in FIGS. 1C and 1D, the striking plate 130 is substantially flat, having a nominal front surface to rear surface thickness, t1, and a front surface to rear projection thickness, t2. The front surface to rear surface thickness t1 is the cross-sectional thickness of the striking plate 130 as measured between a location on the front surface 132 between the land areas located between the scorelines or grooves 135, 136 and other surface texture markings 137, and a corresponding location defined at the bottom of a recess 139 on the rear surface 133 of the striking plate. The front surface to rear projection thickness t2 is the cross-sectional thickness of the striking plate 130 as measured between a location on the front surface 132 between the land areas located between the scorelines or grooves 135, 136 and other surface texture markings 137, and a corresponding location defined at the outer surface of a projection 138 on the rear surface 133 of the striking plate.

The values for the front surface to rear surface thickness t1 and front surface to rear projection thickness t2 of the striking plate 130 will depend upon the electroforming process. The striking plate thickness is selected consistent with long term club use to avoid premature striking plate failure due to fatigue cracking and other such failure modes. In use, the striking plate 130 is subject to numerous high speed impacts with a golf ball, and should resist permanent deformation. In addition, different types of iron-type golf clubs (e.g., long irons, short irons, wedges) can experience different forces in golf ball impacts, and the striking plate thickness can be adjusted accordingly, as desired. In several preferred embodiments, the value for the front surface to rear surface thickness, t1, is from about 0.20 to about 0.50 mm, such as from about 0.20 to about 0.40 mm, such as from about 0.20 to about 0.30 mm. In several preferred embodiments, the value for the front surface to rear projection thickness, t2, is from about 0.25 to about 1.00 mm, such as from about 0.40 to about 0.90 mm, such as from about 0.50 to about 0.80 mm.

The electroforming processes described herein are capable of providing scorelines or grooves 135, 136 and/or surface texture markings 137 and other features having a broad range of sizes and shapes, and/or having a broad range of cross-sectional profiles. Advantageously, the electroforming processes described herein are capable of providing these designs with a high degree of precision, and with a manufacturing yield that is much higher than the manufacturing yield provided by conventional striking plate manufacturing methods, such as casting, forging, milling, etc.

In the embodiments shown, the scorelines or grooves 135, 136 and surface texture markings 137 each have bottom surfaces and side walls that define nominal depth and width dimensions. The transitions between the bottom surfaces and the side walls are radiused to provide smooth transitions. The scorelines or grooves 135, 136, for example, may include radii of curvature that are typically less than about 0.55 mm, such as less than about 0.50 mm. In several embodiments, the scorelines or grooves 135, 136 have a depth of from about 0.01 mm to about 0.50 mm, and a width of less than about 0.90 mm, such as from about 0.50 mm to about 0.90 mm. Additional embodiments and details concerning the size and shape of the scorelines or grooves is set forth in U.S. Pat. No. 6,814,673, which is incorporated by reference herein.

The surface texture markings 137 also have bottom surfaces and side walls that define nominal depth and width dimensions. In several embodiments, the surface texture markings 137 have a geometric shape having a depth of from about 0.005 mm to about 0.018 mm, and a width of from about 0.10 mm to about 0.20 mm. The geometric shapes preferably all have the same size and shape, preferably square or diamond, although other shapes, e.g., circles, triangles, etc. and/or varieties of shapes and/or sizes, alternatively could be used. The geometric shapes are preferably uniformly distributed over the reference areas of the front surface 132 of the striking plate, which is defined between each pair of adjacent scorelines or grooves 135, 136. In other alternative embodiments, the front surface 132 of the striking plate includes an engineered texture such as the geometric shapes, designs, and patterns described in U.S. Pat. No. 7,445,561, which is incorporated by reference herein. In practical examples, the grooves 135, 136 and surface texture markings 137 have dimensions, transition radii, and other parameters selected so as to conform to the Rules of Golf.

Figure 1F:
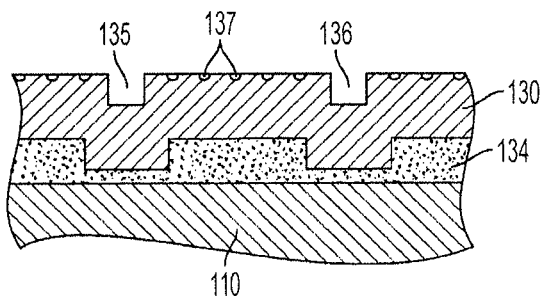
FIG. 1F is a partial sectional view of the iron-type golf club head of FIG. 1A.

In the embodiments shown in FIGS. 1D and 1F, the rear surface 133 of the striking plate includes a plurality of projections 138 defining a plurality of recesses 139 therebetween. The projections 138 on the rear surface 133 are generally aligned with the scorelines or grooves 135, 136 on the front surface 132 of the striking plate. In the embodiments shown, the projections 138 are generally wider than the corresponding scorelines or grooves 135, 136, having a width t3 of from about 0.70 mm to about 1.50 mm. The recesses 139, on the other hand, will have a width, t4, that is generally narrower than the spacing between adjacent scorelines or grooves 135, 136 on the front surface of the striking plate. The cross-sections of the rear surface projections 138 and recesses 139 shown in FIG. 1D are merely one example, as square, trapezoidal, semicircular, triangular, or other shapes for the projections and/or recesses can be used. Moreover, different cross-sectional shapes and dimensions can be used in different portions of the striking plate 130.

FIG. 1F shows a partial cross-section of the striking plate 130 after it has been attached to the club head body 110. The striking plate 130 may be attached to the club head body 110 by adhesive bonding, welding, brazing, soldering, diffusion bonding, mechanical fastening, riveting, screwing, etc. In the embodiment shown, the striking plate 130 is attached to the club head body 110 by a layer of adhesive material 134, such as an epoxy or polyurethane adhesive. For example, in an embodiment, the adhesive material 134 is 3M® DP460, though other suitable adhesive materials may be used. The adhesive 134 is applied so as to fill the gap completely between the striking plate 130 and the club head body 110 within the mounting region 121. The thickness of the layer of adhesive material 134 is preferably between about 0.05 mm to about 0.4 mm, such as from about 0.07 mm to about 0.15 mm, such as about 0.1 mm. In embodiments in which the adhesive layer 134 has a non-uniform thickness, such as the embodiment shown in FIG. 1F, the foregoing measurements would apply to the area of the thinnest layer of adhesive material. To enhance the bonding strength of the adhesive, in some embodiments, the rear surface 133 of the striking plate and/or the surface of the mounting region 121 of the club head body are treated prior to attachment of the striking plate. For example, in some embodiments, the rear surface 133 of the striking face is subjected to a media blasting process, e.g., using sand or ceramic glass beads to slightly roughen the surface to enhance the strength of the adhesive bond. In one embodiment, the rear surface 133 of the striking face is subjected to a media blast using low pressure and a grit size of between about 100 mesh to about 400 mesh, such as, for example, between about 180 mesh and about 320 mesh, prior to bonding the striking plate 130 to the club head body 110.

In some embodiments, one or more optional backing plates are positioned between the striking plate and the head body. For example, in several embodiments, one, two, three, or four or more backing plates are positioned between the striking plate and the head body. The one or more optional backing plates may be included to obtain any of several performance advantages, such as to improve the durability of the striking plate and/or the club head, to improve the sound or feel of the club head upon impact with a golf ball, or to improve other performance objectives. These performance advantages can be achieved, or enhanced, by providing one or more backing plates having particular structures, geometries, materials, material properties, etc.

Some examples of materials that can be used to form the one or more optional backing plates described herein include, without limitation: metals (e.g., titanium, steel, aluminum, magnesium, etc.); metal alloys (e.g., nickel alloys, cobalt alloys, molybdenum alloys, combinations, etc.); metallic materials; viscoelastic elastomers; vinyl copolymers with or without inorganic fillers; polyvinyl acetate with or without mineral fillers such as barium sulfate; acrylics; polyesters; polyurethanes; polyethers; polyamides; polybutadienes; polystyrenes; polyisoprenes; polyethylenes; polyolefins; styrene/isoprene block copolymers; metallized polyesters; metallized acrylics; epoxies; epoxy and graphite composites; natural and synthetic rubbers; ceramic materials; piezoelectric ceramics; thermoset and thermoplastic polymers or rubbers; foamed polymers; ionomers; low-density fiber glass; bitumen; silicone; multi-material combinations; and mixtures or combinations thereof. The metallized polyesters and acrylics can comprise aluminum as the metal. Commercially available materials include resilient polymeric materials such as Scotchdamp™ from 3M, Sorbothane® from Sorbothane, Inc., DYAD® and GP® from Soundcoat Company Inc., Dynamat® from Dynamat Control of North America, Inc., NoViFlex™ Sylomer® from Pole Star Maritime Group, LLC, Isoplast® from The Dow Chemical Company, and Legetolex™ from Piqua Technologies, Inc.

Referring to FIGS. 2A-2D, another embodiment of a representative iron-type club head 200 includes a head body 210 and a striking plate or contact plate 230. The head body 210 includes a heel 212, a toe 213, a top line 214, a sole 216, and a hosel 240 configured to attach the club head 200 to a shaft (not shown in FIGS. 2A-2D). The head body 210 defines a striking plate mounting region 221 configured to receive the striking plate 230 and an optional backing plate 250. Club head mass may be distributed about the perimeter of the club body 210 based on a particular mass distribution for the club head 200 selected by a club head designer, as discussed previously in reference to the embodiment illustrated in FIGS. 1A-1F.

Figure 2A:
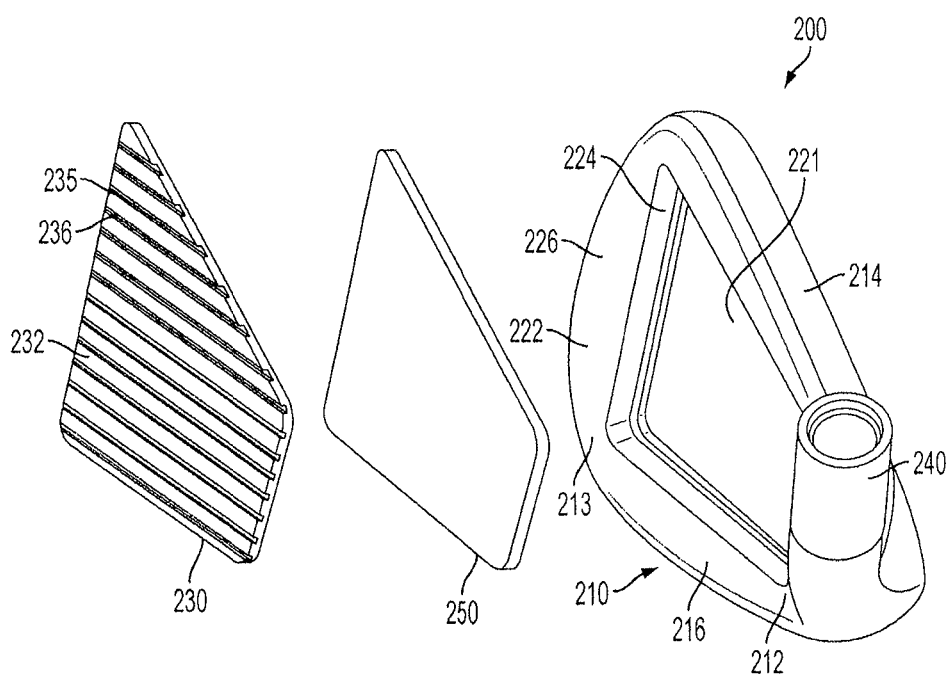
FIG. 2A is an exploded view of another representative embodiment of an iron-type golf club head.

As shown in FIG. 2A, the striking plate 230, the optional backing plate 250, and the head body 210 are preferably formed separately. In such a design, the completed club head is made by securing the striking plate 230 and the optional backing plate 250 to the mounting area 221 by bonding with an adhesive, welding, or other process. The mounting area 221 defines a recess, or pocket, formed in the forward surface of the club head body 210. In the embodiment shown, the perimeter of the recess defined by the mounting area 221 is slightly larger than the perimeter of the striking plate 230 and the optional backing plate 250, thereby providing for the ability to position the striking plate 230 and backing plate 250 into the recess. A gap or seam 224 is thereby defined between the walls of the recess of the mounting area 221 and the perimeter of the striking plate 230. In some embodiments, the seam 224 has a width that is preferably less than about 0.5 mm, such as less than about 0.25 mm, such as less than about 0.1 mm. In alternative embodiments, the club head body 210 does not include a recessed mounting area 221. Instead, the striking plate 230 and optional backing plate 250 are secured directly to the forward-facing surface of the club head body 210, and no gap or seam 224 is formed.

A front surface 222 of the club is defined by both a striking surface 232 of the striking plate 230 and portions 226 of the club body 210. The front surface 222 can be polished, blasted using an abrasive media, or ground to remove any front surface edges situated at the striking plate/club body seam 224. In some examples, the portions 226 are polished and the front surface 232 of the striking plate 230 is finely ground. The striking surface 232 is a substantially planar grooved surface configured to strike a golf ball, although for some players, other portions of the front surface 222 also contact the golf ball.

As noted above, grinding, blasting, polishing, and/or coating (e.g., PVD coating) operations can be used to remove any excess material or irregularities introduced in the bonding, welding, or other process, or to provide a selected club head appearance such as, for example, a specularly reflective polished appearance, a fine ground appearance, a darkened or black appearance, or other appearance. The striking plate 230 preferably includes a set of grooves, such as exemplary grooves 235, 236 formed in the striking surface 232. The striking plate 230 may also include an additional surface texture, such as secondary surface markings 237 (see, e.g., FIGS. 2B and 2D). The grooves 235, 236 and secondary surface markings 237 are similar to those described previously in reference to the embodiment illustrated in FIGS. 1A-1F.

Figure 2B:
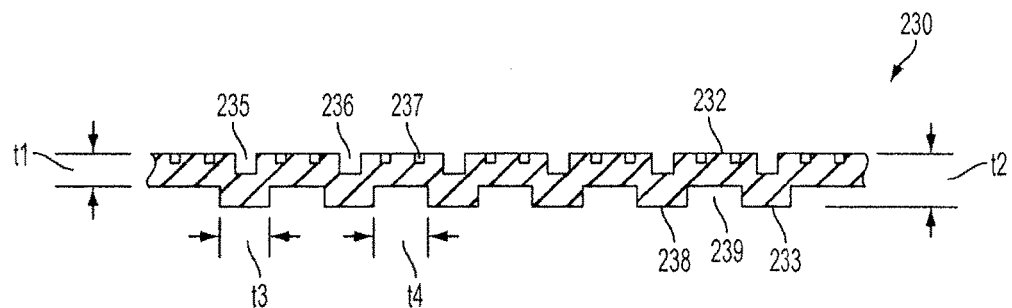
FIG. 2B is a sectional view of a portion of a striking plate of the iron-type golf club head of FIG. 2A.

In some embodiments, the head body 210 is formed by casting, forging, stamping, or other known manufacturing process, using the processes and materials described above in reference to the embodiment illustrated in FIGS. 1A-1F. Similarly, in the embodiment shown, the striking plate 230 is formed using an electroforming process, which is also described above in relation to the embodiments illustrated in FIGS. 1A-1F. The striking plate 230 includes pluralities of projections 238 and recesses 239 on its rear surface, and includes thickness ranges for the thicknesses t1, t2, t3, and t4 as described above in relation to the striking plate 130 illustrated in FIGS. 1A-1F. The cross-sections of the rear surface projections 238 and recesses 239 shown in FIG. 2B are merely one example, as square, trapezoidal, semicircular, triangular, or other shapes for the projections and/or recesses can be used. Moreover, different cross-sectional shapes and dimensions can be used in different portions of the striking plate 230.

Figure 2C:
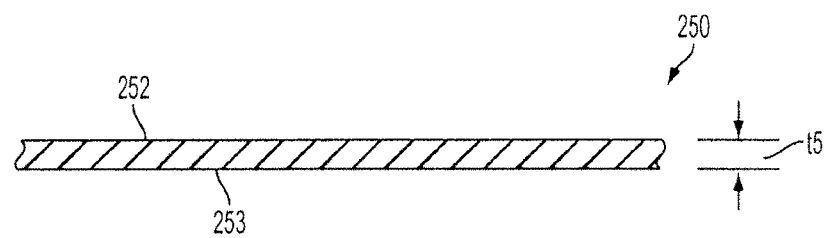
FIG. 2C is a sectional view of a portion of an intermediate plate of the iron-type golf club head of FIG. 2A.
Figure 2D:
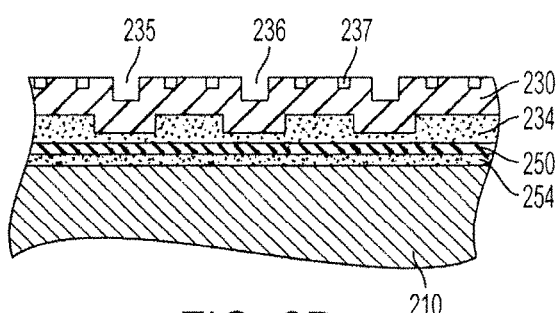
FIG. 2D is a partial sectional view of the iron-type golf club head of FIG. 2A.

Turning to FIGS. 2C-2D, the optional backing plate 250 includes a forward surface 252 and a rear surface 253. In the embodiment shown, the backing plate 250 is substantially flat on both its forward surface 252 and rear surface 253, having a substantially uniform thickness t5. The thickness t5 will be dependent upon the material of the backing plate and the desired performance objective for including the backing plate, among other factors. In several embodiments, the backing plate 250 has a thickness of from about 0.1 mm to about 3.0 mm, such as from about 0.5 mm to about 2.0 mm, such as from about 1.0 mm to about 1.5 mm. The striking plate 230 and backing plate 250 can be attached to the club head body 210 by adhesive bonding, soldering, brazing, welding, mechanical fastening, riveting, screwing, etc. In the embodiment shown in FIG. 2D, the backing plate 250 is attached to the club head body 210 by a first adhesive layer 254, and the striking plate 230 is attached to the backing plate 250 by a second adhesive layer 234. The adhesive materials used in the first adhesive layer 254 and second adhesive layer 234 can be the same as those used in the adhesive layer 134 described above in relation to the embodiments illustrated in FIGS. 1A-F.

Referring to FIGS. 3A-3D, another embodiment of a representative iron-type club head 300 includes a head body 310 and a striking plate or contact plate 330. The head body 310 includes a heel 312, a toe 313, a top line 314, a sole 316, and a hosel 340 configured to attach the club head 300 to a shaft (not shown in FIGS. 3A-3D). The head body 310 defines a striking plate mounting region 321 configured to receive the striking plate 330 and an optional backing plate 350. Club head mass may be distributed about the perimeter of the club body 310 based on a particular mass distribution for the club head 300 selected by a club head designer, as discussed previously in reference to the embodiment illustrated in FIGS. 1A-1F.]

Figure 3A:
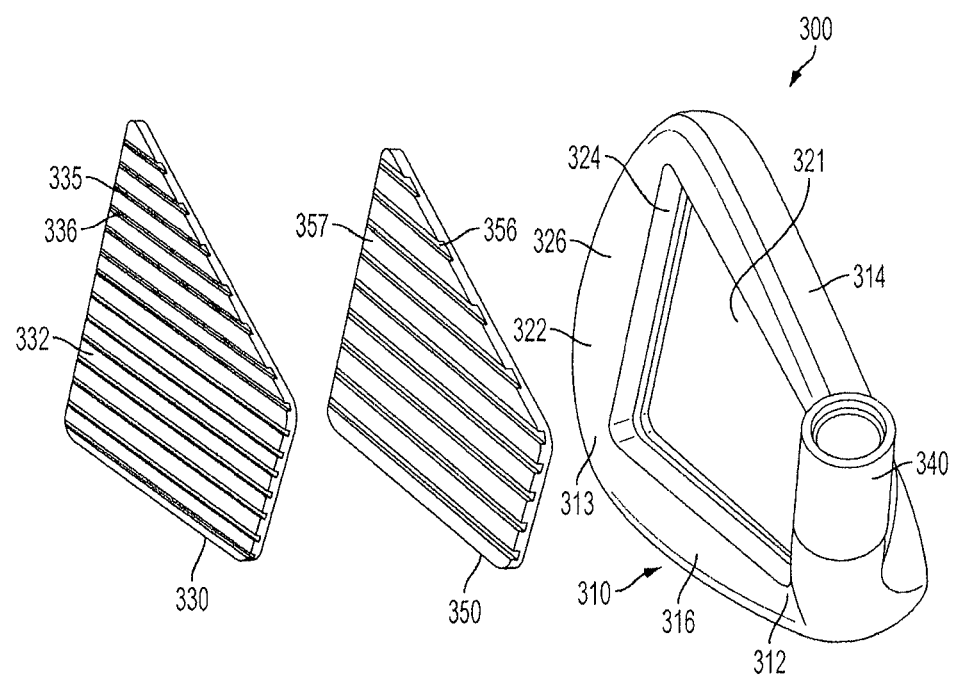
FIG. 3A is an exploded view of another representative embodiment of an iron-type golf club head.
Figure 3B:
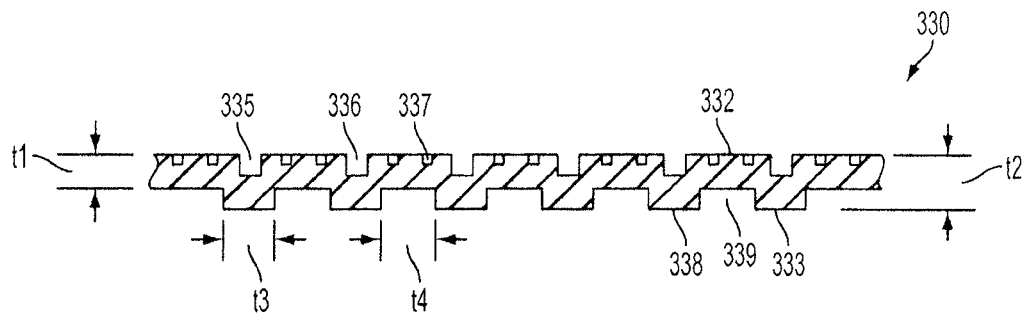
FIG. 3B is a sectional view of a portion of a striking plate of the iron-type golf club head of FIG. 3A.

As shown in FIG. 3A, the striking plate 330, the optional backing plate 350, and the head body 310 are preferably formed separately. In such a design, the completed club head is made by securing the striking plate 330 and the optional backing plate 350 to the mounting area 321 by bonding with an adhesive, welding, or other process. The mounting area 321 defines a recess, or pocket, formed in the forward surface of the club head body 310. In the embodiment shown, the perimeter of the recess defined by the mounting area 321 is slightly larger than the perimeter of the striking plate 330 and the optional backing plate 350, thereby providing for the ability to position the striking plate 330 and backing plate 350 into the recess. A gap or seam 324 is thereby defined between the walls of the recess of the mounting area 321 and the perimeter of the striking plate 330. In some embodiments, the seam 324 has a width that is preferably less than about 0.5 mm, such as less than about 0.25 mm, such as less than about 0.1 mm. In alternative embodiments, the club head body 310 does not include a recessed mounting area 321. Instead, the striking plate 330 and optional backing plate 350 are secured directly to the forward-facing surface of the club head body 310, and no gap or seam 324 is formed.

A front surface 322 of the club is defined by both a striking surface 332 of the striking plate 330 and portions 326 of the club body 310. The front surface 322 can be polished, blasted using an abrasive media, or ground to remove any front surface edges situated at the striking plate/club body seam 324. In some examples, the portions 326 are polished and the front surface 332 of the striking plate 330 is finely ground. The striking surface 332 is a substantially planar grooved surface configured to strike a golf ball, although for some players, other portions of the front surface 322 also contact the golf ball.

As noted above, grinding, blasting, polishing, and/or coating (e.g., PVD coating) operations can be used to remove any excess material or irregularities introduced in the bonding, welding, or other process, or to provide a selected club head appearance such as, for example, a specularly reflective polished appearance, a fine ground appearance, a black or darkened appearance, or other appearance. The striking plate 330 preferably includes a set of grooves, such as exemplary grooves 335, 336 formed in the striking surface 332. The striking plate 330 may also include an additional surface texture, such as secondary surface markings 337 (see, e.g., FIGS. 3B and 3D). The grooves 335, 336 and secondary surface markings 337 are similar to those described previously in reference to the embodiment illustrated in FIGS. 1A-1F.

In some embodiments, the head body 310 is formed by casting, forging, stamping, or other known manufacturing process, using the processes and materials described above in reference to the embodiment illustrated in FIGS. 1A-1F. Similarly, in the embodiment shown, the striking plate 330 is formed using an electroforming process, which is also described above in relation to the embodiments illustrated in FIGS. 1A-1F. The striking plate 330 includes pluralities of projections 338 and recesses 339 on its rear surface, and includes thickness ranges for the thicknesses t1, t2, t3, and t4 as described above in relation to the striking plate 130 illustrated in FIGS. 1A-1F.

Figure 3C:
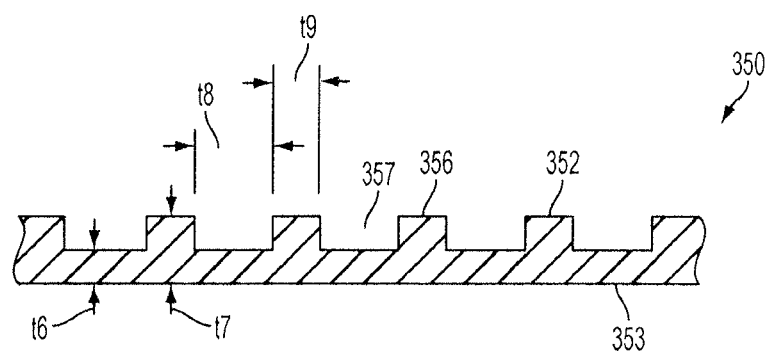
FIG. 3C is a sectional view of a portion of an intermediate plate of the iron-type golf club head of FIG. 3A.
Figure 3D:
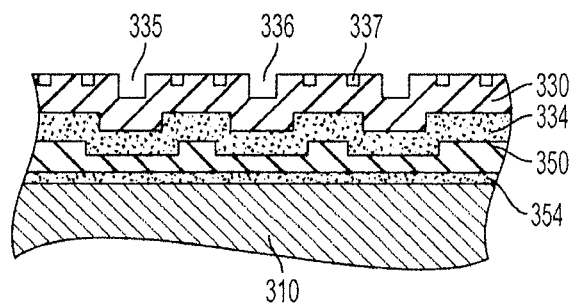
FIG. 3D is a partial sectional view of the iron-type golf club head of FIG. 3A.

Turning to FIGS. 3C-3D, the optional backing plate 350 includes a forward surface 352 and a rear surface 353. In the embodiment shown, the backing plate 350 is substantially flat on its rear surface 353, and includes a plurality of projections 356 and recesses 357 on its forward surface 352. In some embodiments, the thickness t6 of the backing plate 350 at the location of a recess 357 may be from about 0.1 mm to about 3.0 mm, such as from about 0.20 mm to about 2.0 mm, such as from about 0.25 mm to about 1.0 mm. In some embodiments, the thickness t7 of the backing plate 350 at a location of a projection 356 may be from about 0.25 mm to about 3.25 mm, such as from about 0.40 mm to about 2.5 mm, such as from about 0.50 mm to about 1.0 mm. In some embodiments, the width (t8) of the recesses 357 is substantially equal to the width of the reference areas between the grooves 335, 336 formed on the striking surface of the striking plate 330, and the width (t9) of the projections 356 is substantially equal to the width of the grooves 335, 336 on the striking plate 330. The locations, sizes, and cross-sectional shapes of the forward surface projections 356 and recesses 357 shown in FIGS. 3C-3D are merely one example, as square, trapezoidal, semicircular, triangular, or other shapes for the projections and/or recesses can be used. Moreover, different cross-sectional shapes and dimensions can be used in different portions of the backing plate 350.

As shown, for example, in FIG. 3D, in some embodiments, the projections 356 and recesses 357 on the forward surface of the backing plate are generally aligned, center-to-center, with respective ones of the recesses 339 and projections 338 formed on the rear surface of the striking plate 330, respectively. As a result, the adhesive layer 334 located between the striking plate 330 and the backing plate 350 may have a substantially uniform thickness across the contact area between the adhesive layer 334 and the backing plate 350 and striking plate 330. In other embodiments, such as described below in reference to FIG. 4D, the alignment of the projections and recesses are reversed, such that the respective projections are aligned with each other and the respective recesses are aligned with each other. As discussed below, the alignment of the striking plate and backing plate, as well as the striking plate projections and recesses and backing plate projections and recesses, may be varied to provide one or more desired performance objectives.

The backing plate thicknesses t6, t7 will be dependent upon the material of the backing plate 350 and the desired performance objectives for including the backing plate, among other factors. The striking plate 330 and backing plate 350 can be attached to the club head body 310 by adhesive bonding, soldering, brazing, welding, mechanical fastening, riveting, screwing, etc. In the embodiment shown in FIG. 3D, the backing plate 350 is attached to the club head body 310 by a first adhesive layer 354, and the striking plate 330 is attached to the backing plate 350 by a second adhesive layer 334. The adhesive materials used in the first adhesive layer 354 and second adhesive layer 334 can be the same as those used in the adhesive layer 134 described above in relation to the embodiments illustrated in FIGS. 1A-F.

Referring to FIGS. 4A-4D, another embodiment of a representative iron-type club head 400 includes a head body 410 and a striking plate or contact plate 430. The head body 410 includes a heel 412, a toe 413, a top line 414, a sole 416, and a hosel 440 configured to attach the club head 400 to a shaft (not shown in FIGS. 4A-4D). The head body 410 defines a striking plate mounting region 421 configured to receive the striking plate 430 and an optional backing plate 450. Club head mass may be distributed about the perimeter of the club body 410 based on a particular mass distribution for the club head 400 selected by a club head designer, as discussed previously in reference to the embodiment illustrated in FIGS. 1A-1F.

Figure 4A:
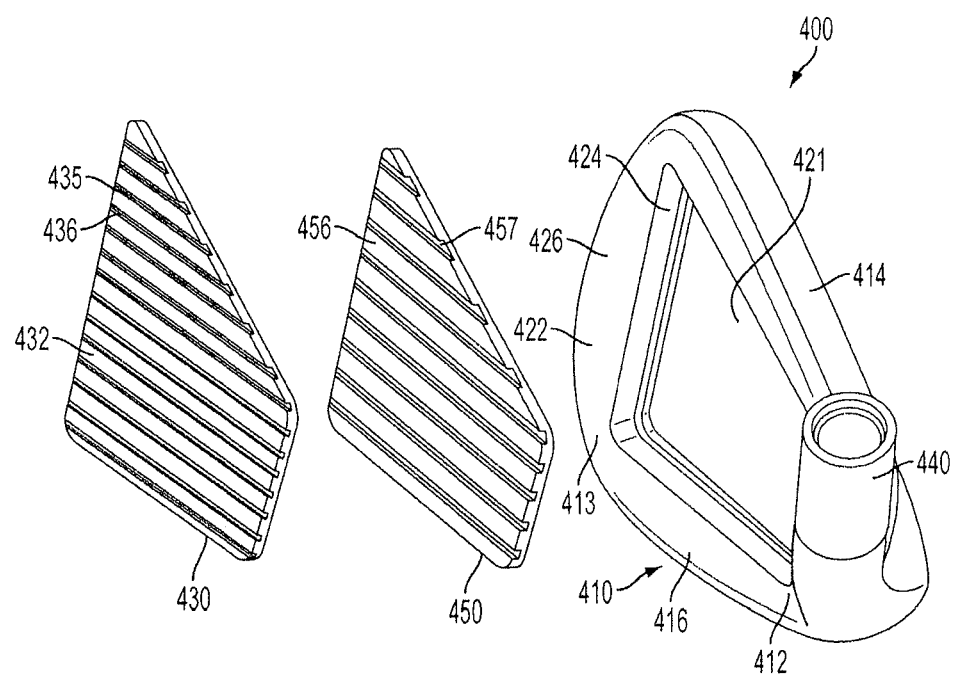
FIG. 4A is an exploded view of another representative embodiment of an iron-type golf club head.

As shown in FIG. 4A, the striking plate 430, the optional backing plate 450, and the head body 410 are preferably formed separately. In such a design, the completed club head is made by securing the striking plate 430 and the optional backing plate 450 to the mounting area 421 by bonding with an adhesive, welding, or other process. The mounting area 421 defines a recess, or pocket, formed in the forward surface of the club head body 410. In the embodiment shown, the perimeter of the recess defined by the mounting area 421 is slightly larger than the perimeter of the striking plate 430 and the optional backing plate 450, thereby providing for the ability to position the striking plate 430 and backing plate 450 into the recess. A gap or seam 424 is thereby defined between the walls of the recess of the mounting area 421 and the perimeter of the striking plate 430. In some embodiments, the seam 424 has a width that is preferably less than about 0.5 mm, such as less than about 0.25 mm, such as less than about 0.1 mm. In alternative embodiments, the club head body 410 does not include a recessed mounting area 421. Instead, the striking plate 430 and optional backing plate 450 are secured directly to the forward-facing surface of the club head body 410, and no gap or seam 424 is formed.

A front surface 422 of the club is defined by both a striking surface 432 of the striking plate 430 and portions 426 of the club body 410. The front surface 422 can be polished, blasted using an abrasive media, or ground to remove any front surface edges situated at the striking plate/club body seam 424. In some examples, the portions 426 are polished and the front surface 432 of the striking plate 430 is finely ground. The striking surface 432 is a substantially planar grooved surface configured to strike a golf ball, although for some players, other portions of the front surface 422 also contact the golf ball.

As noted above, grinding, blasting, polishing, and/or coating (e.g., PVD coating) operations can be used to remove any excess material or irregularities introduced in the bonding, welding, or other process, or to provide a selected club head appearance such as, for example, a specularly reflective polished appearance, a fine ground appearance, a black or darkened appearance, or other appearance. The striking plate 430 preferably includes a set of grooves, such as exemplary grooves 435, 436 formed in the striking surface 432. The striking plate 430 may also include an additional surface texture, such as secondary surface markings 437 (see, e.g., FIGS. 4B and 4D). The grooves 435, 436 and secondary surface markings 437 are similar to those described previously in reference to the embodiment illustrated in FIGS. 1A-1F.

Figure 4B:
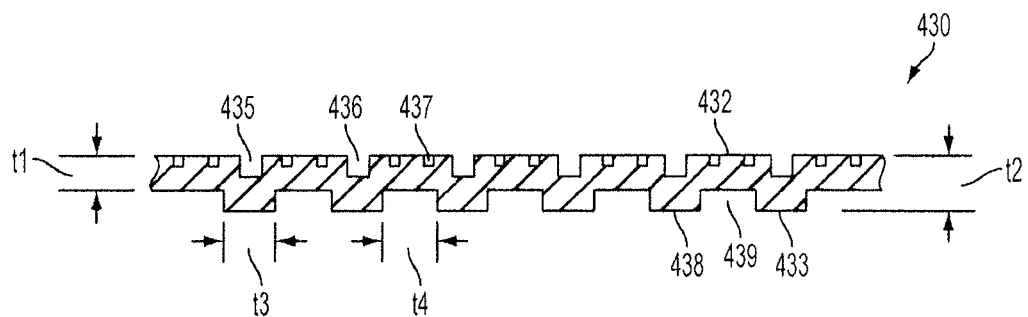
FIG. 4B is a sectional view of a portion of a striking plate of the iron-type golf club head of FIG. 4A.

In some embodiments, the head body 410 is formed by casting, forging, stamping, or other known manufacturing process, using the processes and materials described above in reference to the embodiment illustrated in FIGS. 1A-1F. Similarly, in the embodiment shown, the striking plate 430 is formed using an electroforming process, which is also described above in relation to the embodiments illustrated in FIGS. 1A-1F. The striking plate 430 includes pluralities of projections 438 and recesses 439 on its rear surface, and includes thickness ranges for the thicknesses t1, t2, t3, and t4 as described above in relation to the striking plate 130 illustrated in FIGS. 1A-1F. The cross-sections of the rear surface projections 438 and recesses 439 shown in FIG. 4B are merely one example, as square, trapezoidal, semicircular, triangular, or other shapes for the projections and/or recesses can be used. Moreover, different cross-sectional shapes and dimensions can be used in different portions of the striking plate 430.

Figure 4C:
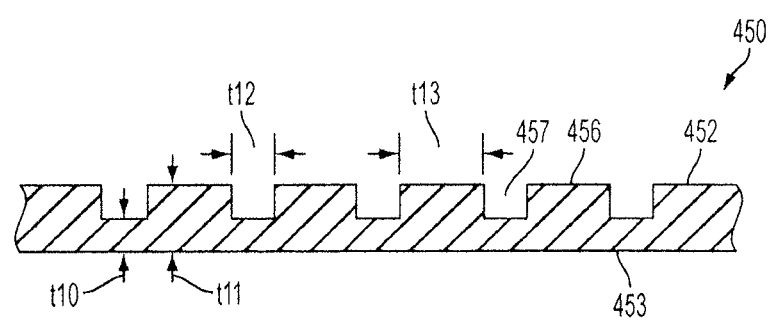
FIG. 4C is a sectional view of a portion of an intermediate plate of the iron-type golf club head of FIG. 4A.
Figure 4D:
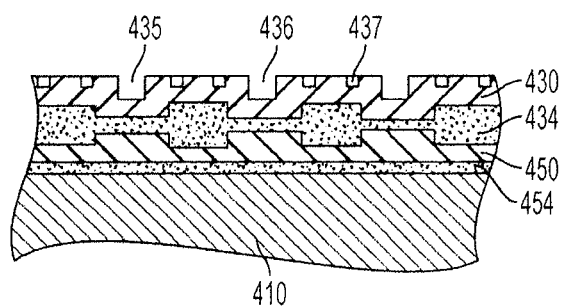
FIG. 4D is a partial sectional view of the iron-type golf club head of FIG. 4A.

Turning to FIGS. 4C-4D, the optional backing plate 450 includes a forward surface 452 and a rear surface 453. In the embodiment shown, the backing plate 450 is substantially flat on its rear surface 453, and includes a plurality of projections 456 and recesses 457 on its forward surface 452. In some embodiments, the thickness t10 of the backing plate 450 at the location of a recess 457 may be from about 0.1 mm to about 3.0 mm, such as from about 0.20 mm to about 2.0 mm, such as from about 0.25 mm to about 1.0 mm. In some embodiments, the thickness t11 of the backing plate 450 at a location of a projection 456 may be from about 0.25 mm to about 3.25 mm, such as from about 0.40 mm to about 2.5 mm, such as from about 0.50 mm to about 1.0 mm. In some embodiments, the width (t12) of the recesses 457 is substantially equal to the width of the recesses 439 formed on the rear surface of the striking plate 430, and the width (t13) of the projections 456 is substantially equal to the width of the projections 438 formed on the rear surface of the striking plate 430. The locations, sizes, and cross-sectional shapes of the forward surface projections 456 and recesses 457 shown in FIGS. 4C-4D are merely one example, as square, trapezoidal, semicircular, triangular, or other shapes for the projections and/or recesses can be used. Moreover, different cross-sectional shapes and dimensions can be used in different portions of the backing plate 450.

The backing plate thicknesses t10, t11 will be dependent upon the material of the backing plate 450 and the desired performance objectives for including the backing plate, among other factors. The striking plate 430 and backing plate 450 can be attached to the club head body 410 by adhesive bonding, soldering, brazing, welding, mechanical fastening, riveting, screwing, etc. In the embodiment shown in FIG. 4D, the backing plate 450 is attached to the club head body 410 by a first adhesive layer 454, and the striking plate 430 is attached to the backing plate 450 by a second adhesive layer 434. The adhesive materials used in the first adhesive layer 454 and second adhesive layer 434 can be the same as those used in the adhesive layer 134 described above in relation to the embodiments illustrated in FIGS. 1A-F.

As shown, for example, in FIG. 4D, in some embodiments, the projections 456 and recesses 457 on the forward surface of the backing plate are generally aligned, center-to-center, with respective ones of the projections 438 and recesses 439 formed on the rear surface of the striking plate 430, respectively. As a result, the adhesive layer 434 located between the striking plate 430 and the backing plate 450 may have a thickness that alternates between relatively thin sections of the adhesive layer 434 located between aligned striking plate rear projections 438 and backing plate forward projections 456, and relatively thick sections of the adhesive layer 434 located between aligned striking plate rear recesses 439 and backing plate forward recesses 457.

Referring to FIGS. 5A-5D, another embodiment of a representative iron-type club head 500 includes a head body 510 and a striking plate or contact plate 530. The head body 510 includes a heel 512, a toe 513, a top line 514, a sole 516, and a hosel 540 configured to attach the club head 500 to a shaft (not shown in FIGS. 5A-5D). The head body 510 defines a striking plate mounting region 521 configured to receive the striking plate 530 and an optional backing plate 550. Club head mass may be distributed about the perimeter of the club body 510 based on a particular mass distribution for the club head 500 selected by a club head designer, as discussed previously in reference to the embodiment illustrated in FIGS. 1A-1F.

Figure 5A:
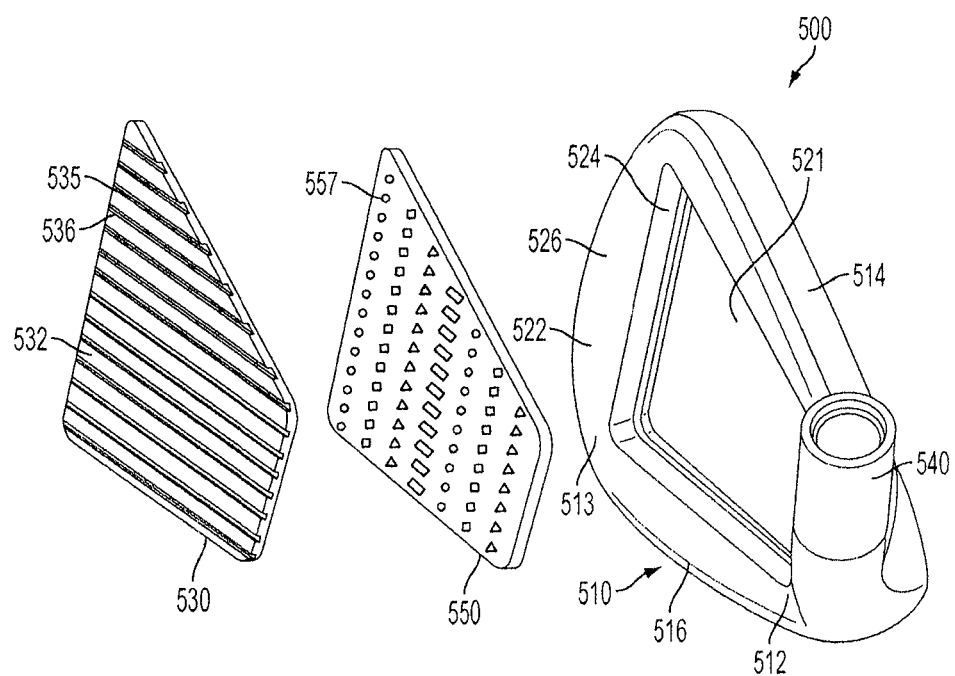
FIG. 5A is an exploded view of another representative embodiment of an iron-type golf club head.

As shown in FIG. 5A, the striking plate 530, the optional backing plate 550, and the head body 510 are preferably formed separately. In such a design, the completed club head is made by securing the striking plate 530 and the optional backing plate 550 to the mounting area 521 by bonding with an adhesive, welding, or other process. The mounting area 521 defines a recess, or pocket, formed in the forward surface of the club head body 510. In the embodiment shown, the perimeter of the recess defined by the mounting area 521 is slightly larger than the perimeter of the striking plate 530 and the optional backing plate 550, thereby providing for the ability to position the striking plate 530 and backing plate 550 into the recess. A gap or seam 524 is thereby defined between the walls of the recess of the mounting area 521 and the perimeter of the striking plate 530. In some embodiments, the seam 524 has a width that is preferably less than about 0.5 mm, such as less than about 0.25 mm, such as less than about 0.1 mm. In alternative embodiments, the club head body 510 does not include a recessed mounting area 521. Instead, the striking plate 530 and optional backing plate 550 are secured directly to the forward-facing surface of the club head body 510, and no gap or seam 524 is formed.

A front surface 522 of the club is defined by both a striking surface 532 of the striking plate 530 and portions 526 of the club body 510. The front surface 522 can be polished, blasted using an abrasive media, or ground to remove any front surface edges situated at the striking plate/club body seam 524. In some examples, the portions 526 are polished and the front surface 532 of the striking plate 530 is finely ground. The striking surface 532 is a substantially planar grooved surface configured to strike a golf ball, although for some players, other portions of the front surface 522 also contact the golf ball.

As noted above, grinding, blasting, polishing, and/or coating (e.g., PVD coating) operations can be used to remove any excess material or irregularities introduced in the bonding, welding, or other process, or to provide a selected club head appearance such as, for example, a specularly reflective polished appearance, a fine ground appearance, a black or darkened appearance, or other appearance. The striking plate 530 preferably includes a set of grooves, such as exemplary grooves 535, 536 formed in the striking surface 532. The striking plate 530 may also include an additional surface texture, such as secondary surface markings 537 (see, e.g., FIGS. 5B and 5D). The grooves 535, 536 and secondary surface markings 537 are similar to those described previously in reference to the embodiment illustrated in FIGS. 1A-1F.

Figure 5B:
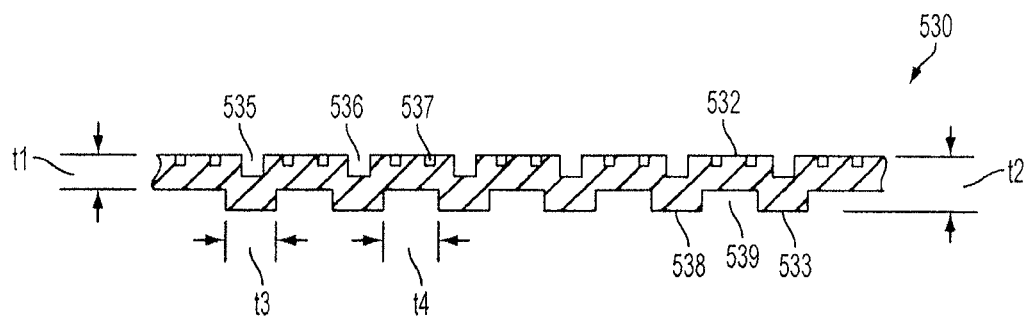
FIG. 5B is a sectional view of a portion of a striking plate of the iron-type golf club head of FIG. 5A.

In some embodiments, the head body 510 is formed by casting, forging, stamping, or other known manufacturing process, using the processes and materials described above in reference to the embodiment illustrated in FIGS. 1A-1F. Similarly, in the embodiment shown, the striking plate 530 is formed using an electroforming process, which is also described above in relation to the embodiments illustrated in FIGS. 1A-1F. The striking plate 530 includes pluralities of projections 538 and recesses 539 on its rear surface, and includes thickness ranges for the thicknesses t1, t2, t3, and t4 as described above in relation to the striking plate 130 illustrated in FIGS. 1A-1F. The cross-sections of the rear surface projections 538 and recesses 539 shown in FIG. 5B are merely one example, as square, trapezoidal, semicircular, triangular, or other shapes for the projections and/or recesses can be used. Moreover, different cross-sectional shapes and dimensions can be used in different portions of the striking plate 530.

Figure 5C:
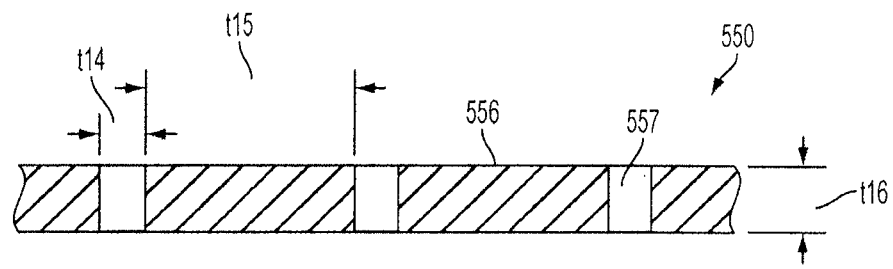
FIG. 5C is a sectional view of a portion of an intermediate plate of the iron-type golf club head of FIG. 5A.
Figure 5D:
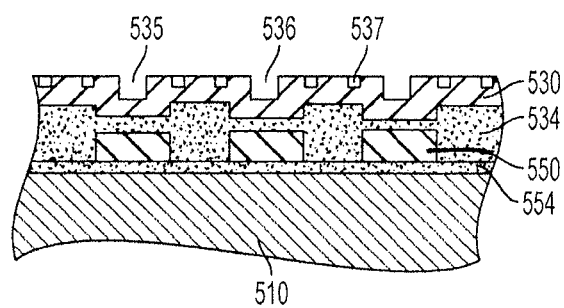
FIG. 5D is a partial sectional view of the iron-type golf club head of FIG. 5A.

Turning to FIGS. 5C-5D, the optional backing plate 550 includes a forward surface 552 and a rear surface 553. In the embodiment shown, the backing plate 550 is substantially flat on both its rear surface 553 and on its forward surface 552 and has a nominal thickness t16. In some embodiments, the thickness t16 of the backing plate 550 may be from about 0.1 mm to about 3.0 mm, such as from about 0.20 mm to about 2.0 mm, such as from about 0.25 mm to about 1.0 mm. In the embodiment shown, the backing plate 550 includes a plurality of square through-holes 557 that extend completely through the backing plate 550 from the forward surface 552 to the rear surface 553 and that are separated by substantially flat reference areas 556. In some embodiments, the width (t14) of the through-holes 557 is substantially equal to the width of the projections 538 formed on the rear surface of the striking plate 530, and the width (t15) of the reference areas 556 is substantially equal to the width of the recesses 539 formed on the rear surface of the striking plate 530. The locations, sizes, and cross-sectional shapes of the through-holes 557 and reference areas 556 shown in FIGS. 5C-5D are merely one example, as round, triangular, trapezoidal, rectangular, or other geometric or non-geometric shapes for the through-holes 557 and reference areas 556 can be used. Moreover, different cross-sectional shapes and dimensions can be used in different portions of the backing plate 550.

The backing plate thicknesses t16 will be dependent upon the material of the backing plate 550 and the desired performance objectives for including the backing plate, among other factors. The striking plate 530 and backing plate 550 can be attached to the club head body 510 by adhesive bonding, soldering, brazing, welding, mechanical fastening, riveting, screwing, etc. In the embodiment shown in FIG. 5D, the backing plate 550 is attached to the club head body 510 by a first adhesive layer 554, and the striking plate 530 is attached to the backing plate 550 by a second adhesive layer 534. The adhesive materials used in the first adhesive layer 554 and second adhesive layer 534 can be the same as those used in the adhesive layer 134 described above in relation to the embodiments illustrated in FIGS. 1A-F.

As shown, for example, in FIG. 5D, in some embodiments, the through-holes 557 on the backing plate 550 are generally aligned, center-to-center, with respective ones of the recesses 539 formed on the rear surface of the striking plate 530. In other embodiments, the through-holes 557 may be generally aligned, center-to-center, with respective ones of the projections 538 formed on the rear surface of the striking plate 530. In still other embodiments, the through-holes 557 of the backing plate 550 may have an aligned that is offset by a defined distance from the centers of either the recesses 539 or the projections 538 of the striking plate 530. In still other embodiments, there may be no correlation between the locations of the through-holes 557 on the backing plate 550 and the locations of the projections 538 and recesses 539 on the striking plate 530.

In the embodiments shown and described above in relation to FIGS. 3A-D, the striking plate projections 338 are aligned with the backing plate recesses 357, and the striking plate recesses 339 are aligned with the backing plate projections 356. This alignment results in a substantially uniform thickness for the adhesive layer 334 located between the striking plate 330 and the backing plate 350. On the other hand, in the embodiments shown and discussed above in relation to FIGS. 4A-4D, the striking plate projections 438 are aligned with the backing plate projections 456, and the striking plate recesses 439 are aligned with the backing plate recesses 457. This alignment results in an adhesive layer 434 located between the striking plate 430 and the backing plate 450 that has a varying thickness. In still another example, in the embodiments shown and discussed above in relation to FIGS. 5A-D, the striking plate projections 538 are aligned with the backing plate reference areas 556, and the striking plate recesses 539 are aligned with the backing plate through-holes 557. This alignment results in an second adhesive layer 534 located between the striking plate 530 and the backing plate 550 that has a varying thickness and that extends through the through-holes 557 to meet the first adhesive layer 554. In still other embodiments, the respective alignments of the striking plate and backing plate, as well as the projections and recesses (if any) contained on the striking plate and the projections, recesses, and through-holes (if any) contained on the backing plate, may be offset from the alignments shown in FIGS. 3A-3D, 4A-4D, and 5A-D. In still other embodiments, first portions of the striking plate and backing plate include projections, recesses, and/or through-holes having a first alignment, while second portions of the striking plate and backing plate include projections, recesses, and/or through-holes having a second alignment. In still other embodiments, first portions of the striking plate and backing plate include projections, recesses, and/or through-holes while second portions of the striking plate and backing plate do not include projections, recesses, or through-holes. Various other combinations are also contemplated.

The various shapes, sizes, and orientations of the described embodiments of the striking plates, backing plates, and adhesive layers are selected to achieve desired performance objectives, such as (without limitation) to change (increase or decrease) the coefficient of restitution (COR) and/or characteristic time (CT) at one or more locations of the striking plate, to improve the durability of the striking plate and/or the club head, to improve the sound or feel of the club head upon impact with a golf ball, or to improve other performance objectives. The materials and layer thicknesses of these components may also be varied to achieve these objectives.

One advantage of the embodiments described above is that the face insert is significantly more durable than a comparable face insert manufactured according to conventional casting or machining processes. The electroforming method of manufacture provides face inserts having increased hardness and durability that are able to withstand a significantly higher number of high speed strikes with a golf ball and that have significantly increased resistance to scratching and scuffing when golf balls are struck in the presence of sand (bunker shots). Another advantage of the embodiments described above is that the face insert is formed in a more precise manner, leading to a significantly higher manufacturing yield in comparison to casting or machining processes used to manufacture conventional face inserts.

It is apparent that the examples described above are representative of the disclosed technology, and that other examples can be provided. Thus, these examples are not to be taken as limiting, and we claim all that is encompassed by the appended claims and the equivalents thereof.

In view of the many possible embodiments to which the principles of the disclosed invention may be applied, it should be recognized that the illustrated embodiments are only preferred examples of the invention and should not be taken as limiting the scope of the invention. It will be evident that various modifications may be made thereto without departing from the broader spirit and scope of the invention as set forth. The specification and drawings are, accordingly, to be regarded in an illustrative sense rather than a restrictive sense.

We claim:

1. A method of manufacturing a golf club head, comprising: providing a mandrel having a negative physical representation of a golf club striking plate; electroforming a striking plate using the mandrel by depositing an alloy of nickel-cobalt on the mandrel, wherein the striking plate consists essentially of a nickel-cobalt alloy having a nickel concentration of at least about 55% and a cobalt concentration of at least about 10%; and attaching the electroformed striking plate to a body of the golf club head.

2. The method of manufacturing a golf club head of claim 1, wherein the step of providing a mandrel comprises:
   providing a master of a golf club head striking plate;
   manufacturing the mandrel from the master.

3. The method of manufacturing a golf club head of claim 2, wherein the step of manufacturing the mandrel from the master comprises electroforming the mandrel.

4. The method of manufacturing a golf club head of claim 1, wherein the step of electroforming a striking plate comprises:
   placing the mandrel into an electrolytic bath;
   electroforming a striking plate sheet using the mandrel, with the striking plate sheet comprising a plurality of striking plates;
   removing the striking plate sheet and mandrel from the electrolytic bath; and
   separating each of the plurality of striking plates from the striking plate sheet.

5. The method of claim 1 wherein the cobalt concentration is less than about 45%.

6. The method of claim 1 wherein the nickel concentration is less than about 90%.

7. The method of claim 1 wherein the cobalt concentration is from about 20% to about 35%.

8. The method of claim 1 wherein the nickel concentration is from about 65% to about 80%.

9. The method of claim 8 wherein the cobalt concentration is from about 20% to about 35%.

10. The method of claim 1 wherein the electroforming step includes forming the striking plate with a front surface having a plurality of scorelines with land areas therebetween and with a rear surface having a plurality of projections generally aligned with the scorelines on the front surface.

11. The method of claim 10 wherein the projections are wider than the scorelines.

* * * * *